June 23, 1970  C. A. BAREFOOT  3,516,399
ELECTROMAGNETIC CATHETER BLOOD FLOW PROBE
Filed April 18, 1967
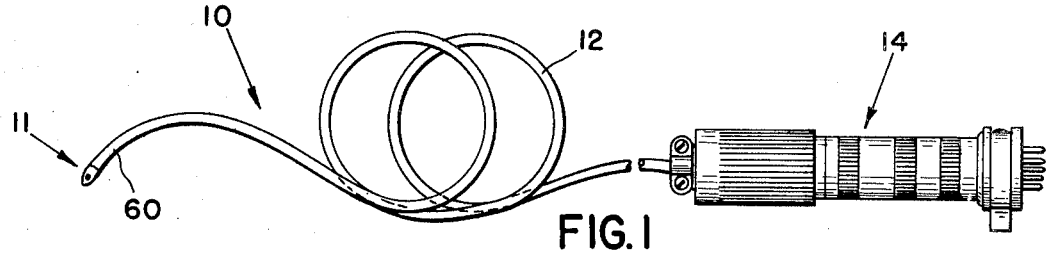
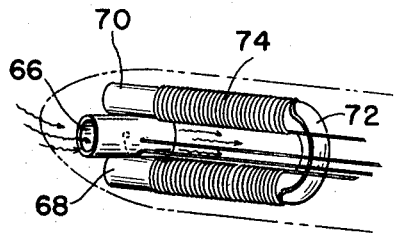 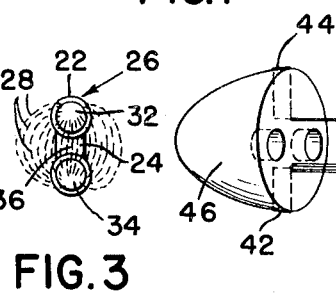 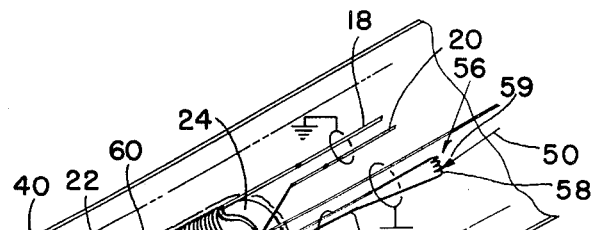
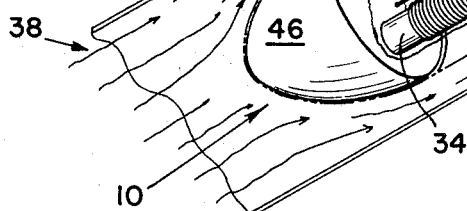
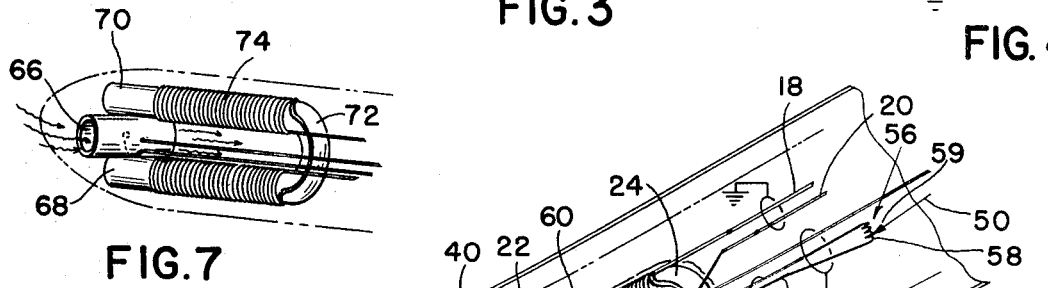
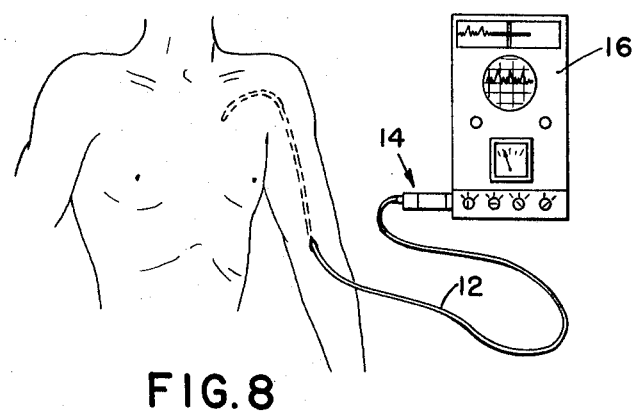 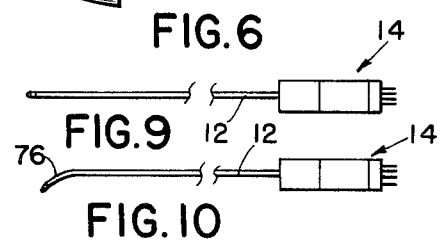
INVENTOR.
CHARLES A. BAREFOOT United States Patent Office 3,516,399
Patented June 23, 1970

3,516,399
ELECTROMAGNETIC CATHETER BLOOD
FLOW PROBE
Charles A. Barefoot, 3800 Cash Drive,
Winston-Salem, N.C. 27107
Filed Apr. 18, 1967, Ser. No. 631,700
Int. Cl. A61b 5/02
U.S. Cl. 128—2.05                            6 Claims

ABSTRACT OF THE DISCLOSURE

A miniaturized electromagnetic catheter blood flow probe having a U-shaped magnetic means at the leading tip of the probe for establishing a flux field, electrodes positioned within the field to sense a voltage induced when conductive blood flows through the field, a housing for insulating and maintaining these components in a fixed relationship and external indicating means, including potential balancing, means connected to the probe.

BACKGROUND, BRIEF SUMMARY AND OBJECTIVES OF THE INVENTION

The historical development of blood flow measurement has been particularly outlined in my application Ser. No. 577,521, filed Sept. 6, 1966, for an electromagnetic catheter blood flow probe. Blood flow probes were intially developed on the principle that the continuous recording of blood flow through blood vessels could be accomplished by the measurement of the electromotive force induced in the blood flowing transverse to an established electromagnetic field. In the case of a circular conduit, similar to an artery, the induced electromotive force is a linear function of the average fluid discharge. In the case where the conduit is itself conductive, it is possible, particularly in the case of blood vessels, to detect flow signals by establishing electrical contact with two points on the outside wall of the conduit, preferably at the opposite ends of a diameter perpendicular to the magnetic field.

Since all blood flow probes in widespread use are of the extra-corporeal or non-cannulating type, the application of which require that the body be surgically opened at the precise position where measurement is to be taken, a catheter probe is particularly significant because it is not necessary when measuring blood flow to expose the vessel at the site where flow measurement is to be taken. Instead the probe can be introduced through a small incision at some convenient place and pushed or passed through the vessel to the location or position where blood flow measurements are desired.

Early activity in the development of catheter blood flow probes centered about a substantially straight electromagnet for creating a flux field, the electromagnet core aligned substantially parallel to the direction of blood flow. The flux field established by this electromagnet was such that positioning of the probe in the geometric center of the blood vessel would give no reading since the electromotive signals generated were symmetrical about this mid-point resulting in a vectorial cancellation of all vertical and horizontal signal components. To avoid this "no reading' possibility, a fin or shim was molded to the probe housing to ensure the off-centered location of the probe upon its introduction into a blood vessel for flow readings.

Further research in catheter blood flow probe construction has disclosed decidedly different flow reading characteristics when the configuration of the electromagnet is changed so that a different flux field is established. Blood flow in a direction substantially parallel to the flux field established by an electromagnet would obviously give no reading, and the central "no-reading" position within the blood vessel discovered in earlier development work with catheter probes was likely the result of flux lines radiating outwardly from the end center of the longitudinally positioned electromagnet which would not be perpendicular to the direction of blood flow and thus not of a configuration necessary to induce electromotive force.

It has been found that the electromagnet constructed in a U-shaped configuration establishes a flux field having generally uniform density across the forward portion of the probe which is substantially maintained at a 90 degree angle to the direction of blood flow. Thus the core and winding configuration of this electromagnet would give responsive readings no matter what location within the blood vessel the probe rested.

With the foregoing in mind, it is therefore a primary object of the present invention to provide an electromagnetic probe for measuring quantitatively the velocity of blood flow whereby volumetric flow rate can be obtained which can be introduced into the body at a convenient location and urged through the unopened blood vessels to a position where blood flow measurements are desired.

Another object of the present invention is to provide a catheter blood flow probe of the type described which can be located precisely at a flow measuring position without surgically exposing the blood vessel at the point of measurement.

Yet still another object of the present invention is to provide a catheter blood flow probe of the type described which can be used interchangeably with existing flow meter equipment.

Yet still another object of the present invention is to provide a catheter blood flow probe of the type described which, because of the configuration of the electromagnet, is capable of sensing induced voltages in any location within a blood vessel.

These and other objects of the present invention will become apparent from a consideration of the following detailed specification taken in conjunction with the accompanying drawings constituting a part hereof in which like characters of reference designate like parts.

FIGURE DESCRIPTION

FIG. 1 is a perspective view of an electromagnetic catheter blood flow probe showing the associated conductor encompassing sheath or cable and connector plug for joining electrically the probe components to a remotely located flow meter.

FIG. 2 is an isolated perspective view of an electromagnet for use with the preferred embodiment of the electromagnetic catheter blood flow probe herein described illustrating the iron core and enveloping coil, the energization of which will establish a magnetic field of flux.

FIG. 3 is an end elevational view of the electromagnet shown in FIG. 2, illustrating the flux field configuration established upon energization of the enveloping coil.

FIG. 4 is an isolated perspective view of the nose block within which blood contacting electrodes are rigidly positioned from which electrodes extend conductors which carry the induced voltage created by blood flow through a magnetically established flux field, one of the conductors fashioned to form a potentiometer.

FIG. 5 is an enlarged exposed perspective view of the combined electromagnet and electrode assembly within the probe covering which is shown in hidden lines.

FIG. 6 is a side elevational view of a combined electromagnet and electrode assembly, the electromagnet formed by surrounding only one leg of the core with a number of turns of insulated wire, the total probe construction representing an alternative embodiment of the present invention.

FIG. 7 is an isolated and perspective view of a U-shaped electromagnet and a lumen forming electrode assembly positioned within a probe covering shown in hidden lines, the total assembly constituting another embodiment of the present invention.

FIG. 8 is a front elevational fragmentary view of a catheter blood flow probe introduced within a human being at a small remote incision illustrating the location and positioning of that probe at an unopened body location from where blood flow readings are taken and registered by means of an associated flow meter.

FIG. 9 is a side elevational fragmentary view of a catheter probe, cable and connector, the probe having a substantially straight configuration.

FIG. 10 is a side elevational, fragmentary view of a catheter probe, cable and connector, the forward portion of the probe, alternatively, being slightly curved at the leading end.

DETAILED DESCRIPTION OF THE INVENTION

Referring now to the drawings and particularly to FIG. 1, there is shown a catheter blood flow probe generally designated 10 having a probe assembly 11 connected with a quantity of conductor-surrounding cable or sheathing 12 and terminating in a connector generally shown as 14 for attachment to a flow meter 16 such as that illustrated in FIG. 8. Cable 12 surrounds the leads 18 and 20 which energize the coil 22 of an electromagnet formed by wrapping a number of turns of wire about a U-shaped iron core 24. Shielded cables (not shown) envelop both the electromagnet leads and the electrode leads subsequently to be described, and these conductor pairs within the magnetically shielded cables are then encompassed or shrouded by the cable 12, which extends forwardly to enclose partially probe assembly 11 and abut against the nose block 46 subsequently to be described. It will be apparent from FIG. 1 that the circumference and diameter of the cable 12 is substantially the same as the circumference of that part of probe 10 which includes probe assembly 11 and its carried nose block.

A voltage is induced in a conductor whenever the conductor is moved across a magnetic field, and conversely, the same thing occurs when the magnetic field is moved across a conductor. It is this relative motion between field and conductor that produces self-induced voltage in a conductor. Thus blood measurement depends upon the induction of voltage in blood flowing in a magnetic field, and the voltage will be induced at right angles to the direction of motion and to the magnetic field, the induced voltage polarity depending upon the polarity of the field and the direction of the conductor's motion. The induced voltage is determined by the velocity of motion, the strength of the field and the length of the conductor, and when blood velocity and vessel size are known, blood volume calculations can be made or read directly from calibrated equipment.

The field of magnetic flux generally designated 26 and particularly shown in FIG. 3 is formed from numerous individual flux lines 28 radiating symmetrically from the ends of the electromagnet formed by coil 22 wrapped about core 24, which, in preferred form, is oriented in a U-shaped configuration and subsequently positioned for blood flow measurement with the legs of the U-shaped member substantially parallel with the longitudinal axis of the probe 10 and with the direction of blood flow, the functional characteristics of which will be more particularly described subsequently. It will be apparent from FIG. 3 that the placement of legs 32 and 34 of the U-shaped core 24 will produce a maximum field of flux about the geometrical center 36 of the formed electromagnet, the flux lines 28 of which are established substantially perpendicular to the direction of blood flow, thus permitting a maximum reading of induced voltage when blood flows proximate the probe at any internal vessel location.

With particular reference to FIG. 5, blood, generally designated 38, flowing in a vessel 40 containing a catheter probe 10, by its transverse flow with respect to the magnetic flux lines 28, generates a voltage signal in a direction transverse to the blood flow and to the magnetic flux. The signal generated is detected between two electrodes 42 and 44 (see FIG. 4) which signal is then amplified and converted to a DC voltage proportional to the blood velocity and volumetric flow rate and made available for visual presentation, computation or storage through an electromagnetic flow meter 16 associated with the probe as shown in FIG. 8.

The electrodes 42 and 44 are preferably rigidly mounted within a nose block 46 which is molded or formed in any suitable manner to receive the legs 32 and 34 of the U-shaped core 24 and thus maintain the electrodes and core in a fixed spaced relationship each with the other. Conductors generally designated 48 and 50 extend from the electrodes 42 and 44 for eventual connection with the flowmeter 16 where the induced voltage signals are converted to usable velocity and flow rate measurements. Conductors 48 and 50 as well as coil conductors 18 and 20 are preferably enclosed in shielded cables which are in turn grounded to avoid stray signal pickup and ensure accurate reading, conductors 48 and 50 paired in one cable and coil leads 18 and 20 placed in a second separate cable.

Flowmeters oftentimes pick up voltage signals caused by the probe acting as a transformer when the alternating magnetic field energization induces a signal into the blood which is in turn picked up by the electrodes and mingled with the induced voltage reflecting the blood flow reading. This psuedo flow signal is an annoyance because it is often difficult and sometimes impossible to distinguish it from real flow readings. The magnitude of this signal is related to the electrical impedance seen by the electrodes, and with the electrodes in direct contact with the blood rather than through the vessel wall, the catheter probe has considerably less impedance. Thus less difficulty with the pseudo flow signal is experienced with a catheter blood probe than with conventional probes wherein a surgically exposed vessel is encapsulated by a probe in direct contact with the vessel wall.

In an effort to balance out the unwanted signal created by this transformer effect, it has been found appropriate to connect two leads 52 and 54 which eventually form one electrode conductor 50 to a single electrode 42 as illustrated in FIG. 4 between which is inserted a balancing potentiometer indicated generally as 56. When a probe is flow meter-connected and positioned in a blood vessel for readings, it is necessary that no initial potential difference exist between the electrodes 42 and 44 so that a true blood flow reading resulting from only the fluid flow through the magnetic field be obtained. The variable resistor 58 has its indicator 59 extending to form electrode lead 50 and allows any unwanted initial potential difference between electrodes 42 and 44 to be balanced out by an appropriate IR drop across a selected value of the resistor which thus establishes a zero or no potential reference upon which accurate blood velocity and flow readings may be reflected.

The most satisfactory results have been obtained from using a catheter blood flow probe of the type described of a size 10 French which is approximately 3.3 millimeters in outer diameter. The nose block or tip 46 is preferably formed of an epoxy resin or like material and is finished smooth and symmetrical without orifices or crevices withing which blood may collect and clot. The signal electrodes 42 and 44 are flush with the outer surface of the tip 46 which makes cleansing of the probe extremely simple particularly since the entire probe is a sealed unit.

The probe assembly 11 including the electrode assembly and electromagnet is encased 60 in a plastic or epoxy resin which will maintain all components in a fixed relationship each with the other to ensure consistency in readings and provide suitable insulation for the entire assembly. The assembly is, in preferred form, approximately 1.5 centimeters long, and, as indicated previously, the maximum signal is obtained when the catheter is parallel to the stream of flow, the polarity depending upon the direction of the flow. A relative test of probe sensitivity in response to the change in direction of flow with respect to the end of the catheter can be easily checked in a beaker of saline. Swishing the probe horizontally will produce only a trace of a signal thus indicating that fluid flow striking the catheter on the side has a minimum effect in including a voltage signal. However, when the probe is swished vertically into the saline a maximum signal deflection is observed.

A number of alternative embodiments have provided satisfactory readings under certain conditions, these particular embodiments illustrated in FIGS. 6 and 7. FIG. 6 illustrates a catheter probe having a single leg 62 of the U-shaped core wound with a number of turns 64 of insulated wire to form an electromagnet which establishes a flux field having significant differing characteristics from that described above.

A lumen-bearing probe is particularly useful when flow readings are desired from a branch or a tributary vessel, the size of which is insufficient to accommodate the entire probe but is sufficient to permit the forward tapered portion of the nose block 46 effectively to seal the vessel opening. The positioning of the lumen-bearing probe such as illustrated in FIG. 7 within a tributary vessel would thus allow blood flow only through the lumen 66, that lumen having a pre-determined diameter to make volumetric flow readily attainable. Because of the capability to measure flow in a tributary vessel through an orifice of fixed diameter, it is readily apparent that the lumen-bearing catheter probe has unlimited flexibility as a diagnostic tool.

Numerous other core configurations are readily apparent, and it is obvious that signal response is directly affected by the configuration of the magnetic flux field established by the electromagnet formed by the core and its cooperating coil.

The external configuration of the catheter probes described herein may be varied to facilitate introduction of the probe within specifically directional blood vessels, two such variations being particularly described in FIGS. 9 and 10. An arcuate forward portion 76 may be especially effective in certain situations to permit probe movement through uniquely directional vessels.

Thus in the broadest sense, the present invention constituting an electromagnet catheter blood flow probe includes an electromagnet for establishing a field of flux, a pair of electrodes positioned proximate the flux field to sense an induced voltage generated when conductive blood flows through the field, and a plastic blanket surrounding and sealing the entire assembly and maintaining the magnet and electrodes in a fixed relationship each with the other for consistent and accurate readings. The probe is to be used with conventional flow meters to indicate the voltage induced in the electrodes, and the electrodes are exposed through the nose block to contact directly the surrounding blood. The electromagnet has a continuous core which is folded upon itself along a line substantially parallel with the longitudinal axis of the probe assembly, and the core has been wrapped with a number of turns of insulated wire along selected portions of its length to conform with the shape of the core. A sheath or cable encloses the coil and electrode leads, and the circumference of the cable is substantially equal to the circumference of the forward portion of the probe and the plastic tip 46 to provide a probe of uniform cross-sectional dimensions.

The versatility of a catheter blood flow probe of the type described is obvious because of the numerous applications possible by the use of such an instrument. For example, radiopaque dyes can be inserted or injected through the catheter for delineation of vascular and cardiac anatomy, drugs may be injected into the bloodstream through the probe by suitable passages and orifices included therein, blood pressure may be taken at various body locations by the provision of requisite components to the probe, and numerous blood samples can be taken by a suitably adapted probe from strategic body locations. Additionally, the probe can be adapted to include measuring devices for precise readings of internal vessel diameters, and other guide or directional attachments can be incorporated therewith to facilitate maneuverability within the body vessels.

It is apparent that many modifications and variations may be made in the construction and arrangement of the electromagnet, the electrodes, the body housing and the coil configuration as well as other phases of the present inventive concept in light of the above teachings without departing from the real spirit and purpose of this invention. Such modifications of parts as well as the use of equivalents to those herein illustrated and described are reasonably included and contemplated.

What is claimed is:

1. An electromagnetic catheter blood flow probe for detecting the voltage induced by conducting blood moving within the walls of an unopened blood vessel, said probe comprising: magnetic means for establishing a flux field proximate blood flow; electrode means lying proximate the field of flux and adapted to be positioned within the blood vessel and in direct contact with the blood to sense an induced voltage therebetween generated when conducted blood flows through said field of flux; and housing means for insulating said magnetic means and maintaining said magnetic means and electrode means in a fixed relationship each with the other, said housing means about said magnetic means and electrode means forming a substantially linear elongated probe having a substantially circular cross section, said magnetic means including an electromagnet having a continuous core folded upon itself along a line substantially parallel with the longitudinal axis of said housing means and said electrode means affixed to the exterior surface of said housing means.

2. An electromagnetic catheter blood flow probe as claimed in claim 1, said probe including means associated with said electrode means to indicate said induced voltage.

3. An electromagnetic catheter blood flow probe as claimed in claim 2, further comprising current carrying means secured to said magnetic means and said electrode means and extending to said indicating means to transmit voltage signals proportional to the velocity of blood passing through said field of flux; and cable means enclosing said current carrying means, the circumference of said cable means being substantially equal to the circumference of said covering means to provide a probe of uniform circumference for introduction into a blood vessel.

4. An electromagnetic catheter blood flow probe as claimed in claim 3, said electrode current carrying means including potential balancing means adapted to compensate for unwanted induced potentials and establish a zero potential reference whereby said indicating means will indicate the voltage induced by conductive blood.

5. An electromagnetic catheter blood flow probe as claimed in claim 4, the probe arcuately formed near the forward portion to facilitate introduction into blood vessels of irregular configuration.

6. An electromagnetic catheter blood flow probe as claimed in claim 1, said housing means having a lumen positioned proximate said magnetic means adapted to receive blood therethrough.

References Cited

UNITED STATES PATENTS 3,347,224  10/1967  Adams.

OTHER REFERENCES

Pieper, "Review of Scientific Instruments," vol. 29, No. 11, November 1958, pp. 965–967.

Spencer et al., "I.R.E. Transactions on Medical Electronics," vol. BME–6, No. 4, December 1959, pp. 220–228 (only pp. 220–222 relied upon).

WILLIAM E. KAMM, Primary Examiner